United States Patent [19]

Buriks et al.

[11] Patent Number: 4,877,842

[45] Date of Patent: Oct. 31, 1989

[54] DEMULSIFIER COMPOSITIONS AND METHODS OF PREPARATION AND USE THEREOF

[75] Inventors: Rudolf S. Buriks, St. Louis, Mo.; James G. Dolan, Granite City, Ill.

[73] Assignee: Petrolite Corporation, St. Louis, Mo.

[21] Appl. No.: 161,863

[22] Filed: Feb. 29, 1988

[51] Int. Cl.$^4$ .................. B01D 17/04; C09K 7/00
[52] U.S. Cl. .................. 252/344; 252/8.554
[58] Field of Search .................. 252/8.554, 344

[56] References Cited

U.S. PATENT DOCUMENTS

| 2,792,352 | 5/1957 | De Groote et al. | 252/331 |
|---|---|---|---|
| 2,792,353 | 5/1957 | De Groote et al. | 252/331 |
| 2,792,354 | 5/1957 | De Groote et al. | 252/331 |
| 2,792,355 | 5/1957 | De Groote et al. | 252/331 |
| 2,792,356 | 5/1957 | De Groote et al. | 252/331 |
| 2,792,357 | 5/1957 | De Groote et al. | 252/331 |
| 3,383,325 | 5/1968 | Seale et al. | 252/331 |
| 3,383,326 | 5/1968 | Seale et al. | 252/331 |
| 3,511,882 | 5/1970 | Seale et al. | 568/609 |
| 4,474,682 | 10/1984 | Billenstein et al. | 252/344 |
| 4,502,977 | 3/1985 | Buriks et al. | 252/340 |
| 4,546,151 | 10/1985 | Baur et al. | 252/344 |
| 4,626,379 | 12/1986 | Buriks et al. | 252/340 |

FOREIGN PATENT DOCUMENTS

| 1010740 | 5/1977 | Canada . |
| 0055433 | 12/1981 | European Pat. Off. . |
| 0055434 | 12/1981 | European Pat. Off. . |

Primary Examiner—John F. Terapane
Assistant Examiner—Catherine S. Kilby Scalzo
Attorney, Agent, or Firm—Kenneth Solomon

[57] ABSTRACT

A composition comprising the reaction product resulting from subjecting to grafting and esterification reaction conditions a mixture comprising a polyoxyalkylene amine and a vinyl monomer. The mixture is substantially free of copolymers derived from a polyoxyalkylene glycol and a diglycidyl ether, and the reaction product is partially cross-linked. Methods of use and preparation of such compositions are also disclosed.

6 Claims, No Drawings

DEMULSIFIER COMPOSITIONS AND METHODS OF PREPARATION AND USE THEREOF

BACKGROUND OF THE INVENTION

1. Field of the Invention

This invention relates to novel demulsifier compositions, and to methods of preparation and use thereof, and more particularly to novel demulsifying agents for use in processes adapted for preventing, breaking or resolving emulsions of the water-in-oil type, especially petroleum emulsions.

2. Prior Art

A wide variety of oxyalkylated materials are known to be demulsifiers for the resolution of water-in-oil emulsions. For example, it is well known that demulsifiers have been prepared from the condensation of diglycidyl ethers with polyoxyalkylene glycols and that such demulsifiers have been used to resolve certain crude oil emulsions. Note, for example, U.S. Pat. Nos. 2,792,352–357 and U.S. Pat. No. 3,383,326 and EP Nos. 0 55 433–34.

It is also known that such compositions release the water resulting from the resolved emulsion faster and more completely when blended with suitable water coalescing agents such as oxyalkylated adducts of phenol-formaldehyde resins, polyalkylene polyamines and the like. Note U.S. Pat. No. 3,511,882.

Additional improvements have been realized by further heating and condensing such blends. Note U.S. Pat. No. 3,383,325. Moreover, the instant inventors' U.S. Pat. Nos. 4,502,977 and 4,626,379, disclose demulsifier compositions comprising the partially condensed reaction product of a blend of at least two oxyalkylated materials with a vinyl monomer. The oxyalkylated materials are polyoxyalkylene oxide copolymers, and at least one of the copolymers is derived from a polyoxyalkylene glycol and a diglycidyl ether. Such compositions are partially cross-linked.

It is also known that water-in-oil emulsions may be resolved by demulsifiers resulting from the reaction of a polyoxyalkylene alcohol with an unsaturated reactant and further reacting the product so formed with an oxygen or nitrogen-containing vinyl addition monomer to afford polyhydric substituted polyethylene backboned emulsion breakers. Note Canadian Patent No. 1,010,740.

Particular demulsifiers useful in the oil processing and servicing industries have been found to have varying effectiveness, depending in large part on the highly disparate conditions, for example, oil field characteristics, in which the demulsifiers are used. Thus, despite the fact that many demulsifiers have been found for resolving water-in-oil emulsions, the oil processing and servicing industries are continually looking for more effective demulsifiers.

SUMMARY OF THE INVENTION

Briefly, therefore, the present invention is directed to a novel composition comprising the reaction product resulting from subjecting to grafting and esterification reaction conditions a mixture comprising a polyoxyalkylene amine and a vinyl monomer. The mixture is substantially free of copolymers derived from a polyoxyalkylene glycol and a diglycidyl ether. The reaction product is partially cross-linked.

The present invention is further directed to a method for preparation of a demulsifying composition comprising the step of subjecting to grafting and esterification reaction conditions a mixture comprising polyoxyalkylene amine and a vinyl monomer, to produce a partially cross-linked reaction product. The mixture is substantially free of copolymers derived from a polyoxyalkylene glycol and a diglycidyl ether.

The present invention is further directed to a method for demulsifying a water-in-oil emulsion. The method comprises incorporating in such an emulsion an effective demulsifying amount of a composition as set forth above.

Among the several advantages found to be achieved by the present invention, therefore, may be noted the provision of a composition which is a superior demulsifying agent in certain water-in-oil emulsion conditions and the provision of such composition which is economical with respect to many prior art compositions.

DETAILED DESCRIPTION OF THE PREFERRED EMBODIMENT

In accordance with this invention, certain novel compositions have been discovered which are useful in demulsifying water-in-oil emulsions. More specifically, it has been discovered that a very effective demulsifying agent may be formed by reacting a polyoxyalkylene amine directly with a vinyl monomer without the necessity of blending the amine with a copolymer derived from polyoxyalkylene glycol and a diglycidyl ether, as in the methods disclosed in U.S. Pat. Nos. 4,626,379 and 4,502,977, or blending the amine with a reaction product of a polyoxyalkylene alcohol with an unsaturated reactant such as maleic anhydride, glycidyl acrylate, allyl glycidyl ether or an unsaturated acid or ester, as in the methods disclosed in Canadian Patent No. 1,010,740. Thus, surprisingly, it has been found that simply reacting certain polyoxyalkylene amines directly with vinyl monomer produces a demulsifying agent far more effective, generally on the order of about ten times more effective, than the amine without esterification with vinyl monomer, and more effective under certain oil field conditions even than are the demulsifiers produced by reaction of a vinyl monomer and a blend of copolymers as disclosed in the noted patents. Moreover, it has been found that although an oil insoluble product would be expected from polymerization of acrylic acid in an aromatic compound, the compositions of the present invention are in fact water insoluble, and therefore are useful for resolution of water-in-oil type emulsions.

THE OXYALKYLATED REACTANTS

The oxyalkylated reactants utilized in the present invention are well known to those skilled in the demulsification art, as are methods for preparation of the oxyalkylated reactants. The oxyalkylated reactants are prepared by reaction of an amine, preferably a polyamine, with ethylene oxide, propylene oxide, butylene oxide, or some combination of such oxides. Examples of amines which may be utilized to afford the oxyalkylated amine reactant used herein include amines corresponding to the formula

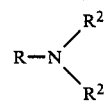

wherein R is an alkyl group, phenyl,

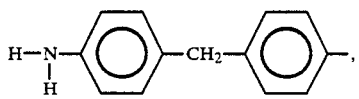

—C(CH$_2$OH)$_3$, —CH$_2$CH$_2$OH, —CH$_2$CH$_2$CH$_2$OH or an alkylamine or a polyalkylene polyamine group such as

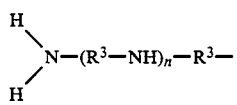

wherein n is an integer from 0 to about 10, R$^3$ is an alkylene group of from about 2 to about 10 carbon atoms, and is preferably dimethylene or trimethylene, most preferably dimethylene, and R$^2$ is hydrogen or an alkoxy of less than about 5 carbon atoms, but preferably hydrogen, hydroxyethyl or hydroxypropyl. Where R is —CH$_2$CH$_2$OH, preferably R$^2$ is also —CH$_2$CH$_2$OH. Preferred amines include mono amines such as triethanolamine, aniline, tris(hydroxymethyl)aminomethane, and almost any other mono amines, and polyamines such as diethylene triamine, triethylene tetramine, and tetraethylene pentamine. Polyamines are preferred over monoamines.

Other amines which may be utilized to afford the oxyalkylated amine reactants used herein include polyalkylene polyamines such as dipropylene triamine, tripropylene tetramine, hexamethylene diamine, bis-hexamethylene triamine and the like.

Amine oxyalkylates suitable for reaction with vinyl monomers according to this invention may be prepared by addition of a desired alkylene oxide or a mixture of two or more such oxides to a suitable amine compound as described above.

As recognized by those skilled in the art, the reaction conditions vary somewhat depending on the alkylene oxide used, but generally the amine, alkylene oxide or combination of alkylene oxides, and a catalyst are mixed in a stirred batch reactor at a temperature maintained within the range of about 90° C.–160° C. The catalyst added for polyoxyalkylene formation preferably is an alkaline catalyst and is included in a concentration of between about one and about ten mole percent, preferably between about one and about two mole percent, based on total molar content of the reaction mixture. Preferred catalysts include potassium hydroxide, sodium hydroxide and sodium hydride. The reaction can also be catalyzed by Lewis acid-type catalysts, such as zinc chloride, BF$_3$-etherates and the like.

Preferred alkylene oxides are ethylene oxide, propylene oxide and butylene oxide. Of these three oxides, butylene oxide is relatively expensive. Accordingly, ethylene oxide and propylene oxide are preferred over butylene oxide. A single type of oxide or a combination of oxides may be employed. If a combination of oxides is to be employed, the alkylene oxides may be added to the amine as a mixture. However, if desired, the oxides may be added to the amine in a sequence, such as first mixing propylene oxide or a mixture of propylene oxide and butylene oxide with the amine, and then adding ethylene oxide.

In view of the relative oil solubility afforded by propylene oxide as opposed to the relative water solubility afforded by ethylene oxide, for many applications a mixture of the oxides is preferred to achieve a solubility balance between oil and water. Thus, while propylene oxide may be added alone, i.e., without addition of any ethylene oxide, it is preferred that both propylene oxide and ethylene oxide be reacted with the amine to produce an oxyalkylated amine wherein the ratio of the number of oxypropylene groups to the number of oxyethylene groups is between about 1 and about 2. In view of the relatively high oil solubility versus water solubility afforded by butylene oxide, when butylene oxide is employed, inclusion of ethylene oxide is highly desirable, particularly in an oxybutylene to oxyethylene ratio in the resultant oxyalkylated amine of between about 1 and about 2.

The resulting compound is a polyoxyalkylene amine. Thus, examples of preferred oxyalkylated amines include compositions corresponding to the formula

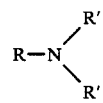

wherein R' is a polyoxyalkylene chain of up to about 60 oxyalkylene groups, and R is selected from the group consisting of alkyl groups of less than about 10 carbon atoms, phenyl, —C(CH$_2$OR')$_3$ wherein R' is defined as above, alkylene amine groups, and

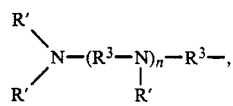

wherein n is an integer from 0 to about 10 is defined as above and R$^3$ is selected from the group consisting of alkylene groups of up to about 10 carbon atoms, arylene groups of up to about 6 carbon atoms, and

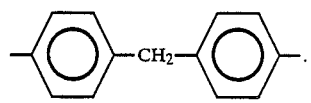

The oxyalkylene groups in the polyoxyalkylene chain are independently selected from the group consisting of oxybutylene, oxypropylene and oxyethylene groups. Preferably, the oxyalkylene groups in the polyoxyalkylene chain are independently selected from the group consisting of oxypropylene and oxyethylene groups, and the ratio of the number of oxypropylene groups to the number of oxyethylene groups is at least 1 and at most 2. Moreover, it is preferable that the polyoxyalkylene chain comprises from about 15 to about 60, most preferably from about 20 to about 40, oxyalkylene groups. While polyoxyalkylated amines of molecular weight of from about 4500 to about 5500 have been found particularly useful, it is believed that far lower molecular weights would be acceptable. Upper limits of the molecular weight would depend on the desired solubility and rheological characteristics for the particular intended application.

VINYL REACTANTS

The vinyl monomers noted as being suitable for preparation of the demulsifier compositions in U.S. Pat. Nos. 4,502,977 and 4,626,379 are also appropriate for preparation of the demulsifier compositions herein. More specifically, such vinyl monomers may be defined as any vinyl monomer which, under free radical conditions will coreact with the oxyalkylated amine described above with loss of its vinyl unsaturation and/or will introduce reactive groups which will play a role during the subsequent partial condensation reaction and improve the activity of the final product as a water-in-oil demulsifier.

Examples of vinyl monomers which may be used in the present invention include acrylic and methacrylic acids and their esters, vinyl esters such as vinyl formate, vinyl acetate, vinyl propionate and the like, acrylonitrile, styrene and other vinyl aromatics, vinyl pyridine, vinyl pyrrolidone, acrylamide, maleic anhydride and its esters and half esters and the like. In general, the vinyl monomer may be any unsaturated compound capable of free radical polymerization and coreaction with the oxyalkylated reactants.

Preferred vinyl monomers include acrylic acid, methacrylic acid, 2-hydroxyethyl methacrylate, acrylonitrile, maleic anhydride and the like.

ADDITION OF VINYL MONOMER REACTANT TO ALKYLENE OXIDE BLOCK COPOLYMER

Oxyalkylated amine and vinyl monomer reactants described above are reacted under free radical polymerization conditions to form an intermediate product of the invention.

The vinyl monomer may be added directly to the oxyalkylated product from the oxyalkylation reaction. Or, if desired, the oxyalkylation reaction product may be transferred to another vessel and mixed with the vinyl monomer in the new reaction vessel. Regardless of which method is used, the oxyalkylated amine need not be separated from the other components of the oxyalkylation reaction product before addition of vinyl monomer.

Where the vinyl monomer is acrylic acid and the amine is a di-, tri-, or tetra-amine, the mixture of reactants is generally in the ratio of about 1 to about 50, preferably about 3 to about 25, especially about 5 to about 20, most preferably about 15, parts by weight of the acrylic acid per 100 parts by weight active or "neat" amine oxyalkylate. Other vinyl monomers and amine oxyalkylates are mixed in generally similar ratios where the weight proportion is calculated as vinyl equivalence of acrylic acid.

A solvent, such as xylene or other relatively inert solvents, is also added in proportions such that the final product after partial condensation is approximately 30% solids. Substantially lower concentrations result in an inefficient process (in view of the relatively higher volume of dilute mixture necessary to achieve the same amount of active product) and generally insufficient cross-linking. Substantially higher concentrations of solids in the final product may result in over cross-linking, thereby producing a gel which, due to its resistance to flow, would be impractical for applications in oil wells.

Preferably, a chain transfer agent, such as isopropanol, isobutanol, or other alcohols or mercaptans, is also added to the mixture to limit cross-linking. The chain transfer agent, which is present in about a one-to-one weight ratio with the vinyl monomer, therefore maintains the molecular weight of the vinyl branches relatively low.

Also added to the mixture is an initiator such as a free radical catalyst. Free radical catalysts useful in the reaction include commercially available initiators such as ammonium persulfate, hydrogen peroxide, dilauroyl peroxide, t-butyl peroxide, 2,2-di(butyl peroxy)butane, dicumyl peroxide, 2,2-azobis(2-methyl propionitrile), 2-butylazo-2-cyanobutane, 4(t-butylperoxycarbonyl)-3-hexyl-6-(7-(t-butylperoxycarbonyl)heptyl)cyclohexane and the like.

Preferred catalysts for employment in the reaction mixture include dibenzoyl peroxide, diacetyl peroxide, dilauroyl peroxide, t-butyl perbenzoate, t-amyl peroctanoate, dicumyl peroxide and the like. In general, the preferred catalysts are organic peroxides which decompose between about 50° C. and 140° C. and are known to induce grafting. The reaction mixture comprises a catalyst in a concentration of from about 2% by weight to about 40% by weight of the monomer added, preferably, from about 10% to about 20% by weight of the monomer added.

The reaction may be conducted at a temperature of from about 40° C. to about 140° C., preferably from about 60° C to about 120° C., especially from about 80° C. to about 100° C. Ideally, the temperature is chosen to be equal to the ten hour half-life temperature of the catalyst, that is, the temperature at which half of a quantity of the catalyst will decompose in ten hours.

The reaction may be conducted in bulk or in solution over a period of from about two to about ten hours under ambient pressure conditions.

The reaction between the oxyalkylated amine and the vinyl monomer generally is continued until the presence of monomer is no longer detected, generally about six hours. The endpoint of the reaction may be detected by the cessation of a slight exotherm or, on an industrial scale, by gas chromatography.

PARTIAL CONDENSATION

The immediate product formed by the reaction between the oxyalkylated amine and the vinyl monomer reactants is subjected to partial condensation under elevated temperature conditions. In a preferred embodiment of the invention, an oxyalkylated reactant is reacted with acrylic acid under free radical conditions and is partially condensed to afford the final product. In general, the partial condensation is carried out at about pH 5 or less and a temperature of from about 100° C. to 200° C. depending on the solvent azeotrope boiling point. A temperature of 150° C.–170° C. is desired. The condensation is conducted over a period of from about six to about thirty hours, preferably from about eight to about twenty hours, especially from about twelve to about sixteen hours. The optimum time period varies, depending on pH and the reagents used in the previous step. Upon cooling, a solvent such as methanol or the like is added to avoid hydrogen bonding and resultant gel formation. Thus, esterification of the oxyalkylated amines grafted with the vinyl monomer is believed to take place between carboxyls of the grafted vinyl monomer and hydroxyls of adjacent molecules such as to effect partial cross-linking.

The product thus formed by reacting the oxyalkylated reactant with a vinyl monomer followed by subsequent condensation comprises demulsifier compositions which have substantially increased demulsifier activity over the original oxyalkylated materials. If desired, the product thus-formed may be employed directly as a demulsifier, without separation of the esterified amine from the other components of the product. In addition, if desired, the demulsifiers of this invention may be blended with other demulsifiers for various demulsification applications.

Since particular demulsifiers are suited to particular oil field and emulsion characteristics, a composition comprising a blend of demulsifiers permits superior demulsification under a variety of conditions. Moreover, since each type of demulsifier performs certain demulsification tasks, e.g., interface separation, agglomeration, or particle transfer, better than other such tasks, a blend of demulsifiers may accomplish a combination of tasks involved in the demulsification process.

In practice at an oil-field, oil as pumped from a well contains water, and so is in the form of a water-and-oil emulsion. The demulsifier composition is incorporated into the oil-and-water emulsion. Techniques for incorporating demulsifiers into emulsion are known in the art. Upon demulsification, standard liquid-liquid separation techniques may be employed to separate the oil and water.

The following, non-limiting examples illustrate specific embodiments of the invention, including the best mode of practice thereof.

In the following section I, examples are given for the preparation of amine oxyalkylates. Section II describes the preparation of the novel demulsifiers from the section I materials by reaction with the vinyl monomers. Section III illustrates activity as demulsifiers.

I. Amine Oxyalkylates

Into a stainless steel autoclave with the usual devices for heating, heat control, stirrer, inlet, outlet, etc., which is conventional in this type of apparatus were charged triethylene tetramine (500 grams), xylene (300 grams) as a solvent, and sodium methylate (15 grams) as a catalyst. The autoclave was sealed and swept with nitrogen gas. Stirring was started immediately and heat was applied. When the temperature reached approximately 145° C., addition of butylene oxide (1500 grams) was started. The butylene oxide employed was a mixture of a straight chain isomer substantially free from isobutylene oxide. The butylene oxide was added continuously at such rate that it was absorbed substantially by the reaction as added. The time required to add the butylene oxide was two hours. During this period the temperature was maintained at 130° C. to 145° C. using cooling water through the inner coils when necessary and otherwise applying heat if required. The maximum pressure during the reaction was 50 pounds per square inch.

Table I presents other non-limiting examples of suitable oxyalkylated amines that were prepared and may be used in the present invention. In these examples, a mixture of propylene oxide (PrO) and ethylene oxide (EtO) were used in place of butylene oxide in the above-described method.

TABLE I

| Example No. | Amine | Moles PrO per mole amine | Moles EtO per mole amine |
|---|---|---|---|
| 1 | Tris(hydroxymethyl)aminomethane | 125 | 83 |
| 2 | Diethylene triamine | 110 | 89 |
| 3 | Triethylene tetramine | 115 | 58 |
| 4 | Triethylene tetramine | 201 | 133 |
| 5 | Tetraethylene pentamine | 196 | 129 |
| 6 | Tetraethylene pentamine | 153 | 101 |

TABLE I-continued

| Example No. | Amine | Moles PrO per mole amine | Moles EtO per mole amine |
|---|---|---|---|
| 7 | Diethylene triamine | 158 | 128 |
| 8 | Tris(hydroxymethyl)aminomethane | 153 | 101 |

II. Reactions of Oxyalkylates From Table I With Vinyl Monomers to Prepare the Novel Compositions of this Invention The following procedure illustrates the method for preparation of the compositions of this invention:

To a 4-necked flask equipped with a mechanical stirrer, heating device, means to remove distillate and nitrogen purge system were added the oxyalkylated reactant (120 grams) of Example 3, and a xylene solvent (295 grams). The reactants were heated to 160° C. for one hour to azeotropically dry the oxyalkylated reactant. Then the reactants were cooled to 25°-35° C., and dilauroyl peroxide (1.6 grams), isopropanol (20 grams) and acrylic acid (20 grams) were added. The reactants were then heated to 72° C. and maintained at that temperature for six hours. The temperature was then increased to 160° C. for twelve hours to remove the water (up to 0.1 ml) of esterification. The product was cooled to 50°-60° C. and 10.0 g of methanol was added to produce a 30.0% active product (467 grams total product), which was then stirred for one hour. This is Example 33 in Table II below.

As a further illustration, by a procedure similar to that described above, oxyalkylated material from Example 3 (60 grams), a xylene-type solvent (120 grams), and p-toluenesulfonic acid (0.6 grams) were charged to the 500 ml flask and the mixture was dried at mild reflux (160° C.) for two hours. After cooling to 30°-40° C., acrylic acid (10.0 grams) and t-butyl perbenzoate (about 0.8 grams) were added. The temperature was then increased to 95° C. and maintained at that level until completion of the polymerization, about five hours. The temperature was then increased to 160° C. and maintained for twelve hours. The product was diluted with diethylene glycol (5.6 grams) and additional xylene solvent to produce a 30.0% active solution.

Similar procedures were followed for other oxyalkylated amines, sometimes with the same relative amount and sometimes with half the relative amount, and in one instance with 150% of the relative amount, of acrylic acid, as shown in Table II below. Copolymers 11, 21, 31, 41, and 51 were not produced by reaction with acrylic acid and so are identical to their oxyalkylated amine substrates.

The examples described above are typical of the preparation of the composition of this invention. The example of this invention will vary depending on which component from Table I is used. The examples will also vary by choice and amount of vinyl monomer. The temperature and initiator during the coreaction of the vinyl monomer and the choice of an acid catalyst for the condensation may also vary. The preparation of illustrative compositions of this invention has been summarized in Table II.

TABLE II

| Copolymer No. | Derived from the Oxyalkylated Amine of Example No. | Acrylic Acid (wgt %) |
|---|---|---|
| 11 | 1 | 0 |
| 12 | 1 | 8 |
| 13 | 1 | 17 |
| 21 | 2 | 0 |
| 22 | 2 | 8 |
| 23 | 2 | 17 |
| 31 | 3 | 0 |
| 32 | 3 | 8 |
| 33 | 3 | 17 |
| 34 | 3 | 25 |
| 41 | 4 | 0 |
| 42 | 4 | 8 |
| 43 | 4 | 17 |
| 51 | 5 | 0 |
| 52 | 5 | 17 |

III. Demulsification with novel compositions of this invention

Compositions of this invention were evaluated by the method generally referred to as the "Bottle Test", described in "Treating Oil Field Emulsions", Second Edition issued by Petroleum Extension Service and the Texas Education Agency in cooperation with the American Petroleum Institute, 1955, (Revised 1962) pgs. 39-44. These evaluations were carried out at wells at various locations, in particular, South Casper Creek, Wyo.; North Midway, Calif.; Coral Creek, Mont.; Howard Glasscock, Tex.; Chapman Exploration, Kans.; Seal Beach, Calif.; East Criner, Okla.; White Castle, La.; Kinsella, Alberta, Canada; Thompson, Tex.; Oregon Basin, Wyo.; Baxterville, Miss.; Bellevue, La.; and elsewhere in the world.

It should be understood that specific responses by a particular crude to a specific composition, as described by this Bottle Test, will vary widely due to the great variety in the nature, composition, character, production method, temperature of the crude oil in question and the specific material under evaluation. Table III shows the characteristics of oil wells of five fields in which the compositions of this invention were tested and compared against standard demulsifying compositions.

TABLE III

| Field | Basic Sediment (%) | Free $H_2O$ (%) | Total $H_2O$ (%) |
|---|---|---|---|
| A | 22 | 18 | 54 |
| B | 62 | 0 | 52 |
| C | 20 | 12 | 36 |
| D | 100 | 0 | 72 |
| E | 60 | 15 | 71 |

Table IV below shows the results of the tests of compositions of this invention for each of fields A-E. The amount water down at various times and the amount of water and basic sediment (BS) and total "grind out" are shown in the table. As indicated, the effectiveness of the compositions of this invention are compared against the standard demulsifying compositions used for the fields and, in some cases, compared against the results if no demulsifier is added.

To obtain results which would more or less predict treatment through the particular treatment system and use, a dose of the indicated amounts of chemical were added to 100 ml samples of produced fluid, followed by mechanical shaking (200 shakes/minute for two minutes). The samples were subsequently observed for 15 minutes at ambient temperature to observe any fast water drop. Next, the samples were placed in a 50° C. bath and observed after the indicated intervals of time. Finally, the samples were gently shaken 25 times (to simulate the water wash in a system) and ground out fairly close to the interface after another hour settling at ambient temperature. The field standard applied to Field D was the same as the reaction product of Example 66 of U.S. Pat. No. 4,502,977.

TABLE IV

Field A:

| Copolymer No. | Dose (ppm) | % $H_2O$ Down Ambient 45 Min. | % $H_2O$ Down 80° C. 90 Min. | % $H_2O$ Down 80° C. 180 Min. | Grind Out % $H_2O$ | Grind Out % BS | Total % Water |
|---|---|---|---|---|---|---|---|
| 11 | 500 | 12 | 15 | 15 | 0 | 0.8 | 0.7 |
| 12 | 500 | 30 | 39 | 39 | 0.6 | 0 | 0.6 |
| 13 | 500 | 36 | 43 | 44 | 0.6 | Trace | 0.6 |
| Field Std. | 500 | 36 | 43 | 44 | 6.0 | 1.0 | 8.0 |

Field B:

| Copolymer No. | Dose (ppm) | % $H_2O$ Down 54° C. 10 Min. | % $H_2O$ Down 54° C. 20 Min. | % $H_2O$ Down 54° C. 30 Min. | % $H_2O$ Down 54° C. 60 Min. | Grind Out % $H_2O$ | Grind Out % BS | Total % Water |
|---|---|---|---|---|---|---|---|---|
| 21 | 20 | 3 | 15 | 36 | 40 | 2.0 | 20.0 | 21.0 |
| 22 | 20 | 3 | 12 | 33 | 42 | 0.1 | 0.4 | 0.7 |
| 23 | 20 | 3 | 7 | 36 | 49 | 0.1 | 0.4 | 0.7 |
| Field Std. | 20 | 0 | 3 | 8 | 34 | — | 0.4 | 0.4 |
| None | — | — | — | — | — | — | 60.0 | 60.0 |

Field C:

| Copolymer No. | Dose (ppm) | % $H_2O$ Down 40° C. 10 Min. | % $H_2O$ Down 40° C. 20 Min. | % $H_2O$ Down 40° C. 30 Min. | % $H_2O$ Down 40° C. 60 Min. | Grind Out % $H_2O$ | Grind Out % BS | Total % Water |
|---|---|---|---|---|---|---|---|---|
| 31 | 60 | 2 | 9 | 27 | 28 | 0.3 | 5.5 | 5.8 |
| 32 | 60 | 4 | 9 | 26 | 30 | 0.5 | 0.7 | 1.2 |
| 33 | 60 | 2 | 3 | 9 | 17 | 0.6 | 0.2 | 0.8 |
| 34 | 60 | 2 | 3 | 7 | 17 | 0.5 | 0.3 | 0.8 |
| Field Std. | 60 | 2 | 6 | 30 | 33 | 0.9 | 0.9 | 0.9 |
| None | — | — | — | 2 | 2 | 1.0 | 31.0 | 32.0 |

Field D:

% $H_2O$ Down       Grind Out

TABLE IV-continued

| Copolymer No. | Dose (ppm) | Ambient 15 Min. | % H₂O Down 50° C. | | % H₂O | % BS | Total % Water |
|---|---|---|---|---|---|---|---|
| | | | 30 Min. | 90 Min. | | | |
| 41 | 30 | — | — | — | No Treatment | | |
| 42 | 30 | 20 | 40 | 60 | 1.0 | 1.0 | 1.8 |
| 43 | 30 | 60 | 70 | 70 | 1.2 | 1.0 | 2.0 |
| Field Std. | 30 | 75 | 75 | 75 | 30 | 0 | 30 |

Field E:

| Copolymer No. | Dose (ppm) | % H₂O Down Ambient 5 Min. | % H₂O Down 50° C. | | | Grind Out | | Total % Water |
|---|---|---|---|---|---|---|---|---|
| | | | 3 Min. | 10 Min. | 15 Min. | % H₂O | % BS | |
| 51 | 20 | 5 | 20 | 55 | 60 | 0.2 | 4.2 | 4.4 |
| 52 | 20 | Trace | 5 | 30 | 50 | 0 | 0.2 | 0.2 |
| Field Std. | 20 | Trace | 10 | 30 | 50 | 0.4 | 0.6 | 1.0 |
| None | — | None | None | Trace | Trace | 20.0 | 38.0 | 58.0 |

Note the generally higher speed of water/oil separation achieved by the compositions of the present invention over the field standards. Bear in mind that compositions 11, 21, 31, 41, and 51, not having been reacted with a vinyl monomer, are not within the scope of the invention. Moreover, the compositions of this invention achieved excellent final grind out. By contrast, the field standard of Field A as well as the field standard of Field D, the latter of which corresponds to Example 66 of U.S. Pat. No. 4,502,977 and is an example of compositions disclosed and claimed by that patent, resulted in the relatively poor final separation compared to the compositions of the instant invention.

While the illustrative embodiments of the invention have been described with particularity, it will be understood that various other modifications will be apparent to, and can be readily made by, those skilled in the art without departing from the spirit and scope of the invention. Accordingly, it is not intended that the scope of the claims appended hereto be limited to the examples and descriptions set forth herein but rather that the claims be construed as encompassing all the features of the patentable novelty which reside in the present invention, including all features which would be treated as equivalence thereof by those skilled in the art to which the invention pertains.

What is claimed is:

1. A method for demulsifying a water-in-oil emulsion comprising adding thereto a composition comprising the reaction product resulting from subjecting to grafting reaction conditions a mixture comprising a solvent, a polyoxyalkylene amine and a vinyl monomer to produce a grafted intermediate and subjecting said grafted intermediate to esterification reaction conditions to produce said reaction product, said mixture being substantially free of copolymers derived from a polyoxyalkylene glycol and a diglycidyl ether, the amount of said solvent in said mixture being such that said reaction product is suitable for use as a demulsifier, and said reaction product being partially cross-linked.

2. A method as set forth in claim 1 wherein said polyoxyalkylene amine corresponds to the formula

wherein R' is a polyoxyalkylene chain of up to about 60 oxyalkylene groups, and R is selected from the group consisting of alkyl groups of less than about 10 carbon atoms, phenyl, —C(CH₂OR')₃ wherein R' is defined as above, alkylene amine groups, and

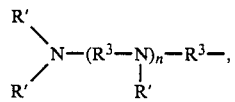

wherein n is an integer from 0 to about 10, R' is defined as above and R³ is selected from the group consisting of alkylene groups of up to about 10 carbon atoms, arylene groups of up to about 6 carbon atoms, and

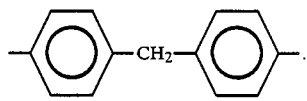

3. A method as set forth in claim 2 further comprising a second demulsifying agent.

4. A method as set forth in claim 2 wherein the oxyalkylene groups in the polyoxyalkylene chain are independently selected from the group consisting of oxybutylene, oxypropylene and oxyethylene groups.

5. A method as set forth in claim 4 wherein the oxyalkylene groups in the polyoxyalkylene chain are independently selected from the group consisting of oxypropylene and oxyethylene groups, and the ratio of the number of oxypropylene groups to the number of oxyethylene groups is at least about 1 and at most about 2.

6. A method as set forth in claim 5 wherein the polyoxyalkylene chain comprises from about 15 to about 60 oxyalkylene groups.

* * * * *